United States Patent [19]

Pasillas

[11] Patent Number: 5,630,600
[45] Date of Patent: May 20, 1997

[54] SHOPPING CART BRAKE

[76] Inventor: Norbert Q. Pasillas, 8644 Jacmar Ave., Whittier, Calif. 90605

[21] Appl. No.: 532,242

[22] Filed: Sep. 22, 1995

[51] Int. Cl.[6] .................................................. B62B 5/04
[52] U.S. Cl. .................... 280/33.994; 280/43.14; 188/19
[58] Field of Search .......... 280/33.991, 33.992, 280/33.994, 87.051, 47.16, 47.2, 43.14, 642, 658, 47.34; 188/19, 21, 23, 7, 6, 5

[56] References Cited

U.S. PATENT DOCUMENTS

| Re. 11,863 | 10/1900 | Meaney et al. | 188/23 |
|---|---|---|---|
| 128,113 | 6/1872 | Chinnock | 188/21 |
| 2,537,909 | 1/1951 | Puddester | 188/5 |
| 2,800,337 | 7/1957 | Avril | 188/23 |
| 3,044,577 | 7/1962 | Lotz | 280/33.994 |
| 3,361,438 | 1/1968 | Davis | 280/33.991 |
| 3,501,164 | 3/1970 | Peterson | 280/33.99 |
| 3,652,103 | 3/1972 | Higgs | 280/33.99 |
| 3,763,966 | 10/1973 | Close | 188/5 |
| 3,951,426 | 4/1976 | Shaffer et al. | 280/47.34 |
| 4,116,464 | 9/1978 | Haley | 280/647 |
| 4,504,073 | 3/1985 | Isaacs | 280/33.992 |
| 4,610,454 | 9/1986 | Gill | 280/33.992 |
| 4,653,764 | 3/1987 | McNeill | 280/33.99 |
| 4,840,388 | 6/1989 | Poughty | 280/33.99 |
| 4,844,209 | 7/1989 | Sedlack | 280/87.051 |
| 4,976,447 | 12/1990 | Batson | 280/33.99 |
| 5,035,445 | 7/1991 | Poulin | 280/763.1 |
| 5,042,622 | 8/1991 | Smith et al. | 188/1.12 |
| 5,048,736 | 9/1991 | Anatra | 280/33.992 |
| 5,090,517 | 2/1992 | Doughty | 188/19 |
| 5,275,472 | 1/1994 | Hicks | 301/105.1 |
| 5,288,089 | 2/1994 | Bowers et al. | 280/33.99 |
| 5,370,408 | 12/1994 | Eagen | 280/33.99 |
| 5,383,536 | 1/1995 | Butter et al. | 188/1.12 |

FOREIGN PATENT DOCUMENTS

| 1553969 | 1/1969 | France | 280/33.992 |

Primary Examiner—Richard M. Camby
Assistant Examiner—Frank Vanaman
Attorney, Agent, or Firm—Walter A. Hackler

[57] ABSTRACT

A restraining device for preventing undesireable motion of a manually propelled cart, or a shopping cart brake, in accordance with the present invention generally includes a frame, a brake foot mounted thereto, and a counterweight for balancing the brake foot in a disengaged position. The device is preferably mounted to a front crossbar of a conventional shopping cart, and upon a manual jerking motion of the cart, the brake foot swings into engagement with a ground surface thus lifting the front wheels off the ground and immobilizing the cart. No levers or complex mechanics are required to engage the brake. The device may also include a hinged door for insertion of product promotions or advertisements on a highly visible portion of the device frame.

16 Claims, 3 Drawing Sheets

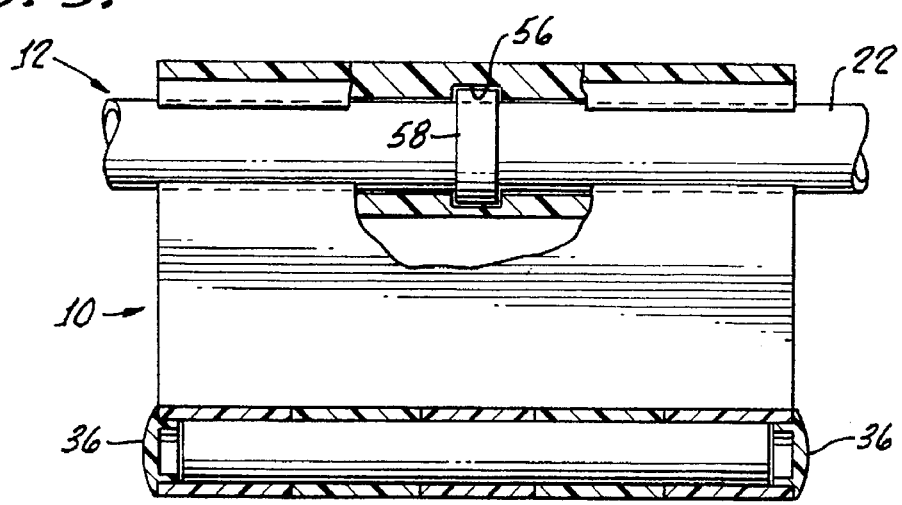
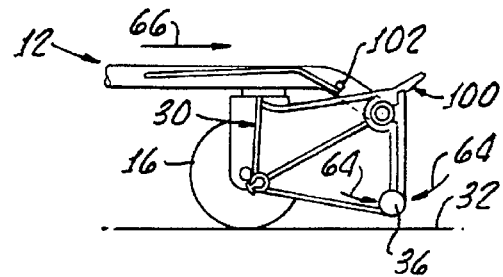
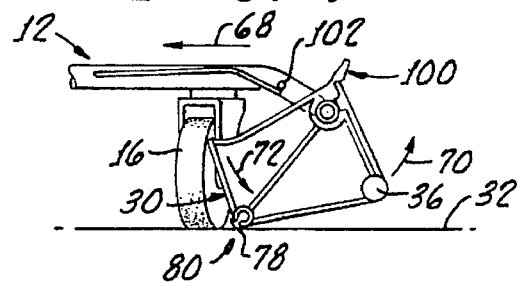
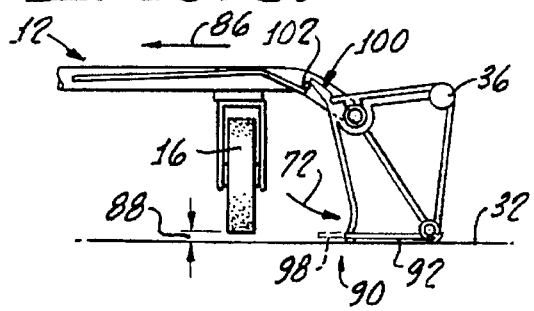
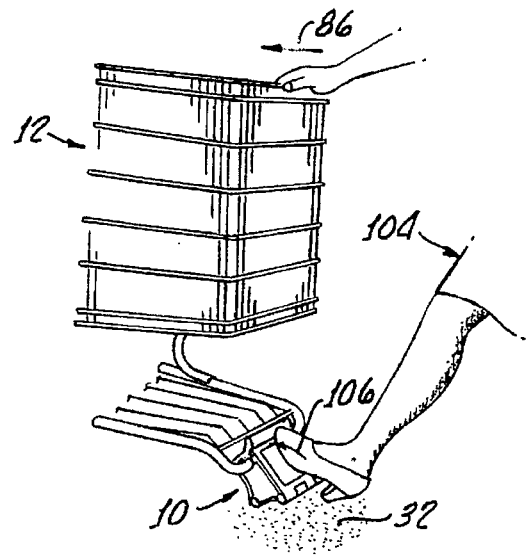

SHOPPING CART BRAKE

The present invention generally relates to manually propelled shopping carts and more particularly relates to a restraining device for preventing undesirable motion of such carts.

In most retail establishments, such as supermarkets, shopping carts are provided for use by customers so that the customer can conveniently transport selected merchandise through the store, past the checkout counter and eventually to the customer's automobile parked on an adjacent parking lot.

Once in the parking lot, the customer will unload the merchandise into the automobile and depart, usually abandoning the cart at the unloading site.

A shopping cart typically comprises a frame, a basket for receiving merchandise, a pair of front wheels and a pair of back wheels of the castor type which will turn in any direction. Because such shopping carts are designed to be easily maneuverable to facilitate a user's travels through the supermarket, shopping carts have the tendency to drift, or freewheel when left unattended.

For example, many parking lots adjacent supermarkets tend to follow the slope of the underlying terrain which may have varying degrees of incline. A cart will tend roll down even the slightest slope when an attending customer eases or releases his hold on the cart, for example, when opening his car door or when assisting a small child seated in the cart. Furthermore, a cart may easily be propelled into motion from a standstill, due to a gust of wind.

Consequently, freewheeling shopping carts cause a significant amount of property damage from collisions with automobiles, buildings and even other carts. A shopping cart heavily loaded with groceries, and momentarily left unattended, can pick up significant momentum before colliding with a parked or moving automobile, causing substantial damage thereto. As a result, lightweight plastic carts, which replace conventional metal carts, are being used in some establishments as a means of decreasing potential damage and the number of lawsuits resulting from cart collisions. Unfortunately, due to lighter weight and increased surface area of their structures, these plastic carts tend to be more easily propelled by forces of wind than their metal counterparts, leading to a higher frequency of freewheeling.

Even more serious than property damage caused by freewheeling carts is physical injury to persons caught unaware of a cart careening toward them at high speeds. Small children in particular are highly prone to injury because they may not be strong or large enough to brake an oncoming cart and may be knocked down thereby.

In addition to causing damage to persons and property, conventional shopping carts are often difficult and aggravating to use. For example, while unloading groceries into an automobile, a customer must often prop the cart against a stationary object in order to keep the cart from drifting away. The stationary object is typically the customer's own automobile. Thus, the cart is carefully positioned against the automobile so that the cart is braced thereby, but in such a way that the automobile will not be scratched by contact with the cart. Alternatively, the customer may kick a wheel of the cart in order to force the wheel perpendicular to the line in which the cart will tend to roll, thus causing the cart to be braked by the position of the wheel. Many times, neither of these techniques will successfully stabilize a cart, resulting in frustration for the customer.

Consequently, many devices, particularly shopping cart brakes, have been developed in recognition of the need for a means to control the motion of shopping carts. Notably, despite the number of brake devices that have been developed over the few decades, very few establishments have found such devices acceptable. The vast majority of retail establishments have not modified their carts to include brakes, typically because such prior art devices are either not economical to the store owner or not friendly to the customer.

Several brakes have been developed which are automatically engaged whenever a cart is not being pushed, or whenever the brake release mechanism is not continuously manually activated. Thus, carts left unattended will not tend to roll by force of gravity or force of wind. The problem with this type of brake is that the cart becomes cumbersome to use since the brake requires active manipulation by a customer in order for the cart to roll forward. Thus, when a user's hands are occupied, for example when guiding small children or while inspecting merchandise, the cart may brake frequently, hindering the natural stride of the user who must be sure to keep his hand engaged to the brake.

Another problem with such automatically engaging devices is that the shopping cart can not be freely moved forward or backward without an operator being in continuous contact with the handle of the cart, thus preventing the cart from being pushed or pulled from the front or sides of the cart. Elderly or disabled persons are particularly prone to suffer from installation of these devices which sometimes require the ability to digitally manipulate the brake release, or a minimal amount of hand strength to hold the brake release while simultaneously pushing the cart. For these and other reasons, an automatically engaging brake device is clearly not desirable. What is needed is a brake device which may be engaged by a positive action of the user.

Another disadvantage of many prior art brake devices is that they are mechanically complex, and cannot withstand the rigorous, repetitive use. For example, many devices employ the use of components such as springs, levers and cables, which require maintenance such as lubrication and fine adjustments. This naturally adds to manufacturing and maintenance costs. What is needed is a brake that can reliably provide positive locking and unlocking engagement on a repetitive basis over a sustained period of time with few or no mechanical components requiring maintenance.

Some prior art devices utilize a brake mechanism which engages with one or more wheels of the cart. These devices typically employ the use of springs for forcing the brake into engagement. The brake and springs therein must be carefully calibrated to provide a positive braking action when desired, but not interfere with the free rolling motion of the cart otherwise. If the brake is not balanced properly against the wheel, it may rub against the wheel while the cart is in motion, thus prematurely wearing the brake pad and wheel.

In addition, kickstand type brakes have been developed which require a user to use his foot to force the brake into engagement with either the ground or the wheel of the cart. The cart is then immobilized by either having one or more wheels lifted off the ground, or having a wheel locked to prevent rotation thereof. One problem with this type of brake is that the foot activation mechanism is difficult to locate and operate, and may not be used at all.

An important consideration with any shopping cart brake is that shopping carts are designed to be nested within each other for purposes of storage and facilitating collecting of multiple carts in a parking lot. If a single shopping cart within a nested configuration has a faulty brake, the entire line of nested shopping carts may be immobilized or difficult to push.

Shopping carts are commonly used as vehicles for product promotion in the form of visible advertisements. This is clearly a benefit for the supermarket and vendors thereof. Thus, although the primary incentive for a market to purchase and install shopping cart brakes may be to reduce the costs of damages and lawsuits resulting therefrom, it would be highly beneficial if such brakes could serve as additional, highly visible advertisement space for vendor products and services. A supermarket could sell the space to vendors for displaying their advertisements, or alternatively, a vendor may provide brakes free of charge in exchange for the right to place its advertisement thereon. The present invention provides such a feature.

All prior art brake devices suffer from one or more of the aforementioned limitations. Thus, as a result there are no cart brakes in widespread use in the United States. Retailers, cart manufacturers and insurance companies are losing millions of dollars annually in accidents involving shopping carts. These problems may be eliminated by use of the shopping cart brake of the present invention which is economical, easy to install, easy to use, durable and reliable.

SUMMARY OF THE INVENTION

A shopping cart restraining device in accordance with the present invention generally comprises a frame upon which is mounted a brake foot and a counterweight. The counterweight provides both means for balancing the brake in a disengaged, generally free swinging position and also provides, upon a jerking motion of the shopping cart, means for causing the brake foot to pivot into engagement with a ground surface. The brake foot and counterweight are disposed on the frame which is connected about a pivot axis, particularly, a crossbar member of the shopping cart.

More particularly, the brake foot and the means for pivotally connecting the device to the crossbar are relationally positioned along the frame such that upon engagement of the brake, the crossbar is raised to a height sufficient to suspend the front wheels off the ground, thus immobilizing the shopping cart.

As is typical of the structure of the majority of conventional shopping carts, forward and between the front wheels of the cart is a crossbar member, located generally about five inches above the ground surface. Preferably, the device of the present invention is adapted to be pivotally connected to this particular forward crossbar member and upon the engagement of the brake foot with the ground surface, the front wheels are lifted. The positioning of the device forward of the front wheels is advantageous for both ease of use and also visibility of the device for display, or advertisement purposes, as will be discussed in more detail hereinafter.

The frame may include means, defining a surface area, for displaying a visible message, such as a product promotion, thereon. More particularly, a frontal facing surface area may be accessed by a subframe, or a hinged door, in order to enable removable insertion of a message placard flush against the frontal facing surface area. In addition, the frame may include a upright facing surface area for a message display which is primarily visible to the cart operator.

The means for pivotally connecting the device to the crossbar may comprise a clamp member, having a substantially semicircular cross section sized to loosely straddle the crossbar. The device may therefor be installed to a shopping cart by a simple snap engagement. Importantly, the device is not fixed firmly with respect to the crossbar, but is able to swing freely when the brake is disengaged. The counterweight is further operative to agitate, or oscillate, the device during normal forward motion of the cart. When the device is used as a visual message or advertisement space, the free swinging feature hereinabove described provides a lure to attract visual attention thereto.

The present invention preferably includes means for limiting pivotal motion of the brake foot in order to prevent the brake foot from pivoting past the engaged position. Particularly, the brake may comprise an extended bottom foot with a curved edge to brace the brake against the ground surface. Additionally or alternatively, a molded stop member adapted to abut a portion of the cart when the brake has been maximally engaged, may be provided.

The brake foot may comprise an elongated frictional pad having substantial surface area for contacting the ground surface. Preferably, the brake is engaged by a user by the user jerking the shopping cart backward, or rearward, thus causing the brake foot of the device to swing forward, catching the ground surface. Once the brake has "caught" the ground, the user thereafter pulls the cart backwards, which lifts the front wheels such that the front end of the cart is supported by the entire surface area of the brake foot. In a braked position, the cart is thus supported on the ground by each of the rear wheels and the brake foot. This three point suspension provides exceptional stability.

In a broad sense, the present invention comprises a shopping cart in combination with the restraining device described above.

BRIEF DESCRIPTION OF THE DRAWINGS

The present invention may be better understood with reference to the following detailed description, taken in conjunction with the accompanying drawings in which:

FIG. 5 shows a cross sectional view of the restraining device taken along line 5—5 of FIG. 3, in order to show a means for preventing transverse travel of the device along the crossbar;

FIG. 6 shows the free swinging position of the retraining device in the disengaged position;

FIG. 7 shows a rearward jerking motion of the shopping cart which causes the restraining device to "catch" the ground surface;

FIG. 8 shows a continuous rearward motion of the shopping cart, subsequent to the motion shown in FIG. 7, which causes the restraining device to fully engage the ground surface and lift the front pair of wheels sufficiently to immobilize the cart; and FIG. 9 shows an alternative method of causing the brake to engage, wherein an operator is manually pushing the cart backward while simultaneously stepping on the restraining device.

DETAILED DESCRIPTION

Figure 1:
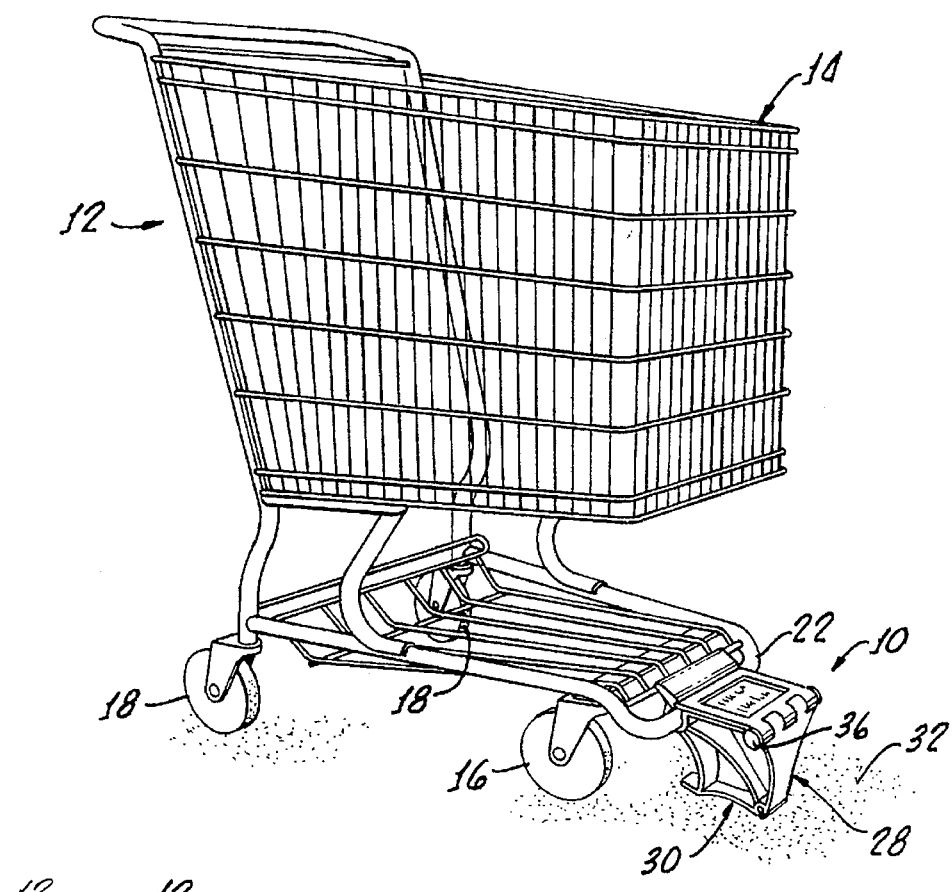
FIG. 1 shows a perspective view of a shopping cart including a restraining device in accordance with the present invention, wherein the device is pivotally connected to a cart crossbar forward of a front pair of wheels and is in engagement with a ground surface.

Turning now to FIG. 1, a restraining device 10 for preventing undesired motion of a manually propelled cart 12 said cart 12 having a basket 14 mounted on front wheels 16 and rear wheels 18, and a crossbar member 22 disposed between the wheels 16, in accordance with the present invention is shown. Generally, the restraining device 10 comprises a frame 28, brake means 30, disposed on the frame 28, for engaging a ground surface 32, and a counterweight 36, disposed on said frame 28. The device 10 is preferably mounted to the front crossbar 22 of the cart 12, which is disposed forward of the front wheels.

Figure 2:
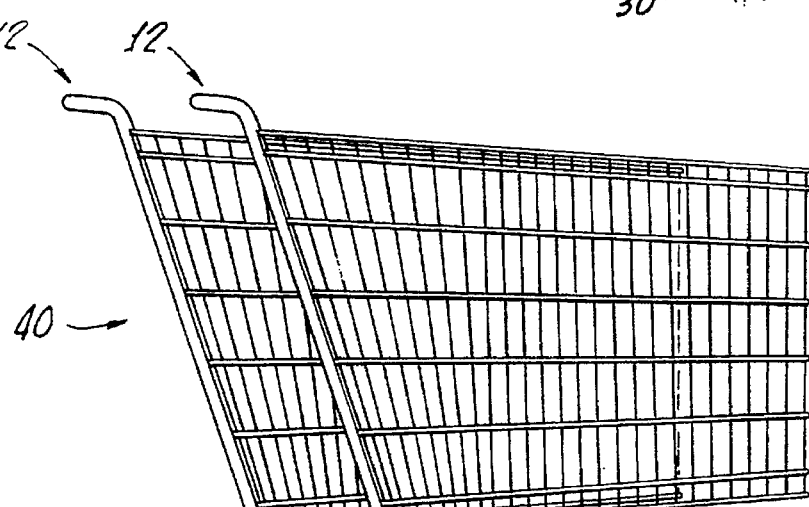
FIG. 2 shows a side view of two stacked shopping carts, each including the restraining device of FIG. 1 in a disengaged position.

Turning now to FIG. 2, two shopping carts 12 in a stacked configuration 40 are shown, each having a restraining device 10 in accordance with the present invention connected thereto. Each restraining device is generally centered on respective crossbars 22, without hindering stacking or driving of multiple carts 12. Notably, FIG. 2 illustrates each retraining device 10 in a free swinging, disengaged position.

Figure 3:
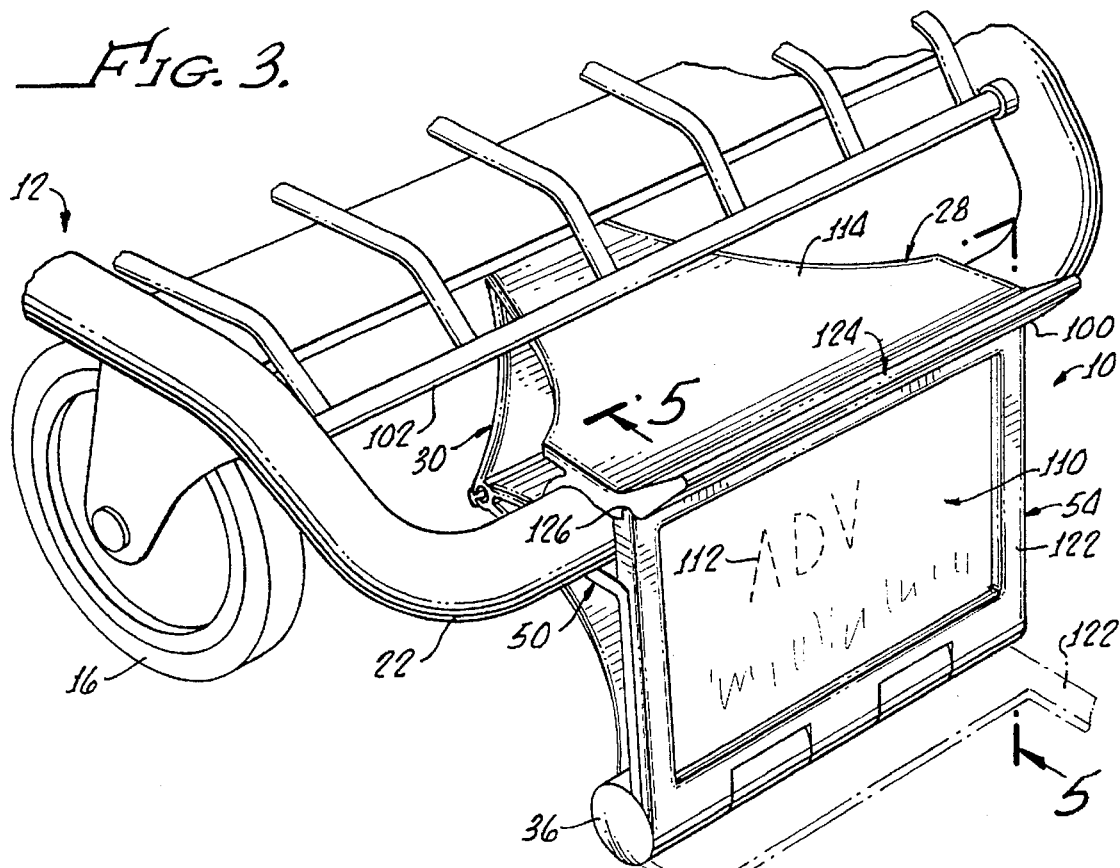
FIG. 3 shows a perspective view of an embodiment of the present invention wherein the restraining device includes a frontal surface area for visible message display as well as means for removably inserting the visible message therein.
Figure 4:
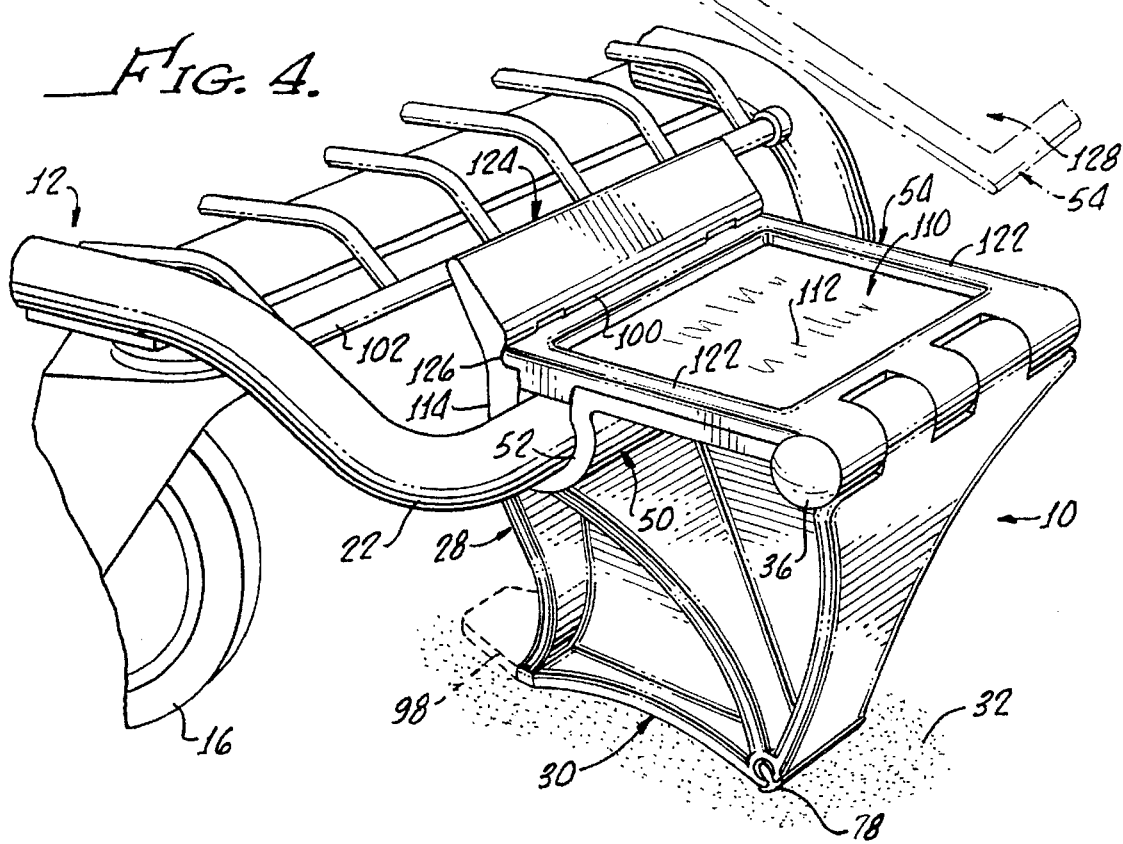
FIG. 4 shows the embodiment shown of FIG. 3 in which the restraining device is in an engaged position.

FIG. 3 and 4 more clearly shows the present invention 10 and several preferred features thereof. Comparing now FIGS. 3 and 4, it is important to note that FIG. 3 shows the device 10 in the free swinging, disengaged position, while FIG. 4 shows the device 10 in engagement with the ground surface 32.

Particularly, the device 10 may be pivotally connected to the cart crossbar 22 by for example, a clamp member 50 having a substantially semicircular cross section 52 sized to loosely straddle the crossbar as shown. The clamp member 50 is manually snapped onto a crossbar 22 in a conventional manner such that the device is able to pivot axially thereabout. A hinged subframe 54, which will be described in greater detail hereinafter, may provide a secure enclosure for preventing the device 10 from disengaging the crossbar 22. The clamp member 50 may be comprised of any suitable material, including metal or plastic, having sufficient resiliency to enable a person installing the device to forcefully snap the device to the crossbar 22. Lubrication (not shown) may be provided on the clamp member in order to maintain the ability of the device 10 to pivot freely. It should be appreciated that instead of a clamp member, any means of pivotally connecting as is known in the art may be used to secure the device 10 to the crossbar 22.

In order to prevent the device from traveling transversely, or sideward, along the crossbar 22, the clamp member 50 may include a groove 56 therein and a cooperating member 58 fixable to the crossbar 22, as shown in FIG. 5. More particularly, the cooperating member may comprise a ring 58 fastened to the crossbar 22 in any conventional manner. This feature enables the clamp member 50 to rotate freely about the crossbar 22 while maintaining its transverse position thereon.

Turning now to FIGS. 6, 7, 8 and 9, the operation of the present invention is shown in steps. FIG. 6 shows the device 10 in the disengaged position. Generally, the device will oscillate gently, shown by arrows 64, in response to normal forward motion of the cart 12, illustrated by arrow 66. The device 10 will also oscillate in response to normal stops and turns, and even backward motion of the cart, such as when a shopper is guiding the cart 12 through a store when selecting merchandise. Importantly, the counterweight 36 balances the brake means 30 in the disengaged, free swinging position, which may be substantially vertical to the ground surface 32, as shown.

FIG. 7 shows the device 10 upon a rearward jerking motion (illustrated by arrow 68) of the cart 12. Due to force exerted on the counterweight by a sudden, accelerated jerking motion 68, the counterweight 36 rotates upward, illustrated by arrow 70, and the brake means 30 rotates forward, in the direction of arrow 72. Upon such a rearward jerking motion 68, the brake means pivots into engagement with the ground surface 32. More particularly, a brake catch 78, for example a rubber or plastic protrusion 78, may be provided on a forward most portion 80 of the brake means 30.

FIG. 8 illustrates a continuous rearward motion (illustrated by arrow 86) of the cart 12 subsequent to the sudden jerking motion 68 shown in FIG. 7, which causes the brake means 30 to fully engage the ground surface 32. Once the brake means 30 has caught the ground 32, the operator may pull the cart backward with a steady motion to cause the device to raise the crossbar 22 a height 88 sufficient to suspend the front wheels 16 off the ground surface 32 such that the front end 90 of the shopping cart 12 is supported by an entire surface area 92 of the brake means 30. No separate levers, springs, or complex mechanics are needed to set the restraining device 10.

Referring back to FIG. 4, which illustrates the brake means 30 in the fully engaged position, the brake means 30 is shown with an optional extended bottom foot 98. The extended bottom foot 98 provides means for limiting pivotal motion of the brake means 30 in order to prevent the device from pivoting past the engaged position. Thus, when cart operator pulls the cart backward, as shown in FIG. 8, the device will resist further axial motion about the crossbar due to the extended bottom foot 98.

Preferably, the means for limiting pivotal motion of the brake means comprises a stop 100, shown most clearly in FIGS. 3, 4, 6, 7, and 8. The stop 100, which provides positive locking against excessive pivotal motion, may be provided alternatively or additionally to the extended bottom foot 98 also shown in these Figures. More particularly, the stop 100, which may comprise a molded plastic member extending along the frame 28 and adjacent the clamp member 50, provides means for abutting a portion 102 of the shopping cart 12. The stop 100 is mounted to the frame 28 in pivotal relationship with the brake means 30. Thus, when the device 10 is rotated about the crossbar 22 to the fully engaged position, shown in FIGS. 4 and 8, the stop 100 will abut the shopping cart portion 102 and prevent further rotation of the brake means 30.

FIG. 9 illustrates an alternative method of causing the brake means 30 to engage the ground surface. More particularly, a cart operator 104, desiring to stabilize the cart 12, may manually push the cart 12 backward, in the direction of arrow 86, while simultaneously stepping on the restraining device frame 28, in the direction of arrow 106, as shown. This method may be preferable, over the jerking method discussed hereinabove, to an operator standing adjacent the frontal portion of the cart 12, for example, a person pulling, rather than pushing, the cart 12 through a parking lot. The design of the present invention as hereinabove described enables a person to set the brake means 30 from any point around the cart 12. Furthermore, the brake means 30 may be disengaged by merely pushing the cart forward, with sufficient force, in the direction of arrow 66, or by gently lifting the front end of the cart 90, which will easily release the device 10 into the free swinging, disengaged position. The manual motions required by a cart operator to set and release the brake 30, as hereinabove described, are remarkably simple and effortless.

Another feature of the present invention is shown most clearly in FIGS. 3 and 4. Particularly, the frame 28 may include means, defining a frontal surface area 110, for displaying a visible message 112 thereon, for example a product promotion, or advertisement. This feature enables a supermarket owner to take advantage of the highly visible surface 110 for displaying written messages 112 in view of consumers traveling near the shopping cart 12. In addition, the frame 28 may include an upright facing surface area 114 for a message display which would be primarily visible to a cart operator (not shown in FIGS. 3 and 4) while guiding the cart 12.

In this respect, the counterweight 36 is further operative as means for agitating the device 10, particularly the frame 28, in order to draw visible attention thereto. In other words, the counterweight 36 operates to gently oscillate the frame 28 during normal motion of the cart 12. This is represented by arrows 64 in FIG. 6. The oscillations naturally attract the eyes of people nearby who may read the visual message 112. Furthermore, reflective decals or the like (not shown) may be placed on the frame 28 surrounding the message display surface areas 110, 114 in order to take advantage of a play of light resulting from the swinging motion of the device 10.

Referring now to the frontal surface area 110 of the frame 28, it is shown in FIG. 3 that subframe 54 may be provided for enabling the visible message 112 to be removably inserted, flush against the frontal surface area 110, into the frame 28. Thus, the visible message 112 may be replaced with a different visible message as desired.

More particularly, the subframe 54 may comprise a hinged door 122. FIG. 3 shows the hinged door 122 in an open position in phantom line, and in a closed position, securing a message 112, in solid line. Notably, the hinged door 122 is further operative as a means of securely enclosing the clamp member 50 about the crossbar 22. The door 122 may be secured in a closed position by any suitable means, such as by a loose snap engagement between a door top border 126 and the clamp number 50.

Furthermore, a clear plastic sheet (not shown) may be disposed over the open face 128 of the subframe 54 in order to provide weather and dust protection to the visible message 112.

In a broad sense, the present invention comprises a shopping cart 12 in combination with the restraining device 10 described above.

Although there has been hereinabove described a shopping cart brake in accordance with the present invention, for the purpose of illustrating the manner in which the invention may be used to advantage, it will be appreciated that the invention is not limited thereto. Accordingly, any and all modifications, variations, or equivalent arrangements which may occur to those skilled in the art should be considered to be within the scope of the invention as defined in the appended claims.

What is claimed is:

1. A restraining device for preventing undesired motion of a manually propelled cart, said cart having a basket mounted on front and rear wheels, and a crossbar mounted to the cart and disposed between the front wheels, said restraining device comprising:

a frame;

brake means, disposed on said frame, for engaging a ground surface;

means for pivotally connecting the brake means to the cart crossbar in a suspended position; and counterweight means, mounted to said frame, for balancing the brake means in a disengaged, free swinging position and, upon a jerking motion of the cart, for causing the brake means to pivot into engagement with the ground surface.

2. The restraining device according to claim 1 further including means, defining a distance between the brake means and the means for pivotally connecting, for enabling the front wheels to be suspended above the ground surface upon the engagement of the brake means with the ground surface.

3. The restraining device according to claim 2 further including means, comprising an extended foot on said brake means, for limiting pivotal motion of the brake means in order to prevent the brake means from pivoting past the engagement with the ground surface.

4. The restraining device according to claim 3 wherein the means for limiting pivotal motion further comprises stop means, mounted on the frame, for abutting a portion of the cart.

5. The restraining device according to claim 1 wherein the means for pivotally connecting comprises a clamp member having a substantially semicircular cross section sized to loosely straddle the crossbar.

6. The restraining device according to claim 5, the means for pivotally connecting comprises means for preventing transverse travel of the device along the crossbar.

7. The restraining device according to claim 1 further comprising means for displaying a visible message on the restraining device, said means for displaying including a frontal surface area of the frame, and door means, hingeably connected to the frame, for enabling removable insertion of the visible means between the frontal surface area of the frame and the door means.

8. The restraining device for preventing undesired motion of a manually propelled cart, said cart having a basket mounted on front and rear wheels, and a crossbar mounted to the cart and disposed between the front wheels, said brake device comprising:

a frame, including means, defining a frontal surface area of the frame, for displaying a visible message;

brake means, disposed on said frame, for engaging a ground surface; means for pivotally connecting the brake means to the cart crossbar in a suspended position; and counterweight means, disposed on said frame, for balancing the brake means in a disengaged, free swinging position and, and upon a jerking motion of the cart, for causing the brake means to pivot into engagement with the ground surface, said free swinging position enabling agitation of the frame during motion of the cart in order to draw attention to the visible message.

9. The restraining device according to claim 8 further including means, defining a distance between the brake means and the means for pivotally connecting, for enabling the front wheels to be suspended above the ground surface upon the engagement of the brake means with the ground surface.

10. The restraining device according to claim 9 further including means, comprising an extended foot on said brake means, for limiting pivotal motion of the brake means in order to prevent the brake means from pivoting past the engagement with the ground surface.

11. The restraining device according to claim 10 wherein the means for limiting pivotal motion further comprises stop means, mounted on the frame, for abutting a portion of the cart.

12. A manually propelled shopping cart comprising:

a basket;

front and rear wheels mounted to the basket;

a crossbar, mounted to the cart and disposed between the front wheels; and restraining means, for preventing undesired motion of the shopping cart, said restraining means comprising a frame, including means, defining a frontal surface area of the frame, for displaying a visible message, brake means, disposed on said frame, for engaging a ground surface, and means for pivotally connecting the brake means to the cart crossbar in a suspended position, and counterweight means, disposed on said frame, for balancing the brake means in a disengaged, free swinging position and, upon a jerking motion of the cart, for causing the brake means to pivot into engagement with the ground surface, said free swinging position enabling agitation of the frame during motion of the cart in order to draw attention to the visible message.

13. The manually propelled shopping cart according to claim 12 further including means, defining a distance between the brake means and the means for pivotally connecting, for enabling the front wheels to be suspended above the ground surface upon the engagement of the brake means with the ground surface.

14. The manually propelled shopping cart according to claim 13 further including means, comprising an extended foot on said brake means, for limiting pivotal motion of the brake means in order to prevent the brake means from pivoting past the engagement with the ground surface.

15. The manually propelled shopping cart according to claim 14 further comprising door means, hingeably connected to the frame, for enabling removable insertion of the visible message between the frontal surface area of the frame and the door means.

16. The manually propelled shopping cart according to claim 15 wherein the means for pivotally connecting comprises a generally semicircular clamp member on said frame, and means, comprising a top border of the door means, for cooperating with the clamp member in order to securely engage the restraining means to the crossbar when the door means is in a closed position.

* * * * *